United States Patent
Lee (10) Patent No.: US 8,384,541 B2
(45) Date of Patent: Feb. 26, 2013

(54) CHARGING METHOD FOR A MOBILE TERMINAL

(75) Inventor: Kwang-Joon Lee, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 381 days.

(21) Appl. No.: 12/697,708

(22) Filed: Feb. 1, 2010

(65) Prior Publication Data

US 2011/0050416 A1 Mar. 3, 2011

(30) Foreign Application Priority Data

Aug. 31, 2009 (KR) ........................ 10-2009-0081531

(51) Int. Cl.
*G08B 21/00* (2006.01)
(52) U.S. Cl. ..................... 340/540; 340/539.1; 455/566; 320/101
(58) Field of Classification Search .................. 340/540, 340/539.1, 636; 455/566, 573; 320/101, 320/108, 112, 114, 137, 152; 136/206
See application file for complete search history.

(56) References Cited

U.S. PATENT DOCUMENTS

| | | | | |
|---|---|---|---|---|
| 5,898,932 A * | 4/1999 | Zurlo et al. | ................. | 455/573 |
| 6,194,873 B1 * | 2/2001 | Matsushita | ................. | 320/137 |
| 6,346,791 B1 * | 2/2002 | Barguirdjian | ............... | 320/101 |
| 6,977,479 B2 * | 12/2005 | Hsu | ............................ | 320/101 |
| 7,295,865 B2 * | 11/2007 | Wang | ......................... | 455/573 |
| 7,486,044 B2 * | 2/2009 | Patino et al. | ................. | 320/103 |
| 2002/0088486 A1 * | 7/2002 | Chen | .......................... | 136/291 |
| 2007/0080925 A1 * | 4/2007 | Radivojevic et al. | ........ | 345/105 |
| 2010/0167797 A1 * | 7/2010 | Morichi | ...................... | 455/572 |

FOREIGN PATENT DOCUMENTS

KR 10-2005-0105300 11/2005

* cited by examiner

*Primary Examiner* — Eric M Blount
(74) *Attorney, Agent, or Firm* — Lee, Hong, Degerman, Kang & Waimey (57) ABSTRACT

A charging method of a mobile terminal is provided. The method comprises detecting brightness of ambient light around the mobile terminal by an illumination sensor of the mobile terminal; activating a charging circuit for charging a battery of the mobile terminal when the detected brightness is more than a first value; measuring a generated current of a solar cell; and deactivating the charging circuit when the generated current of the solar cell is below a second value.

15 Claims, 9 Drawing Sheets

CHARGING METHOD FOR A MOBILE TERMINAL

CROSS-REFERENCE TO RELATED APPLICATION

Pursuant to 35 U.S.C. §119(a), this application claims the benefit of earlier filing date and right of priority to Korean Application No. 10-2009-0081531, filed on Aug. 31, 2009, the contents of which is incorporated by reference herein in its entirety.

FIELD OF ART

The claimed subject matter relates to a charging method for a mobile terminal having a solar cell.

BACKGROUND

Mobile terminals are conveniently portable and have one or more of functions for supporting voice and video calls, communicating information, storing data, etc. Multifunctional mobile terminals can capture still images or moving images, play music or video files, play games, receive broadcast messages, essentially acting as an integrated multimedia player or device.

Attempts have been made to implement said multimedia features in the form of hardware or software integrated into a mobile terminal. For example, a user interface environment is provided in order for users to easily and conveniently retrieve or select the related functions. Typically, a rechargeable battery is connected to the mobile terminal as a power source. When the battery is completely discharged, the battery needs to be recharged. Solar cells have been proposed for recharging the battery of a mobile terminal.

The recharge rate is dependent on the brightness of the ambient light surrounding a mobile terminal. When the mobile terminal is operated in an excessively low luminance environment, the battery is discharged more rapidly than the time needed to recharge the battery via the solar cells.

SUMMARY

In accordance with one or more embodiments, a charging method of a mobile terminal is provided. The method comprises detecting brightness of ambient light around the mobile terminal by an illumination sensor of the mobile terminal; activating a charging circuit for charging a battery of the mobile terminal when the detected brightness is more than a first value; measuring a generated current of a solar cell; and deactivating the charging circuit when the generated current of the solar cell is below a second value.

The illumination sensor is positioned at a first surface of body of the mobile terminal, wherein the first surface has a display, and the solar cell is positioned at a second surface of the body of the terminal. The method further comprises comparing a previously detected brightness by the illumination sensor with the first value when the detected brightness by the illumination sensor is less than the first value. If the previously detected brightness is greater than the first value, power is supplied to the charging circuit. If the previously detected brightness is greater than the first value, an audio or visual signal is generated to alert a user. If the generated current by the solar cell is less than the second value, and the detected brightness by the illumination sensor is more than the first value, an audio or visual signal is generated to alert a user. In one embodiment, if the generated current by the solar cell is less than the second value, when the detected brightness by the illumination sensor is more than the first value, the charging circuit is deactivated.

The mobile terminal may comprise a first terminal body and a second terminal body coupled to the first terminal body in a folding configuration, wherein the illumination sensor and a display of the mobile terminal are positioned on an inner face of the first terminal body in a closed state, and the solar cell is positioned on an external surface of the second terminal body. If the first terminal body is open from the second terminal body, whether to operate the charging circuit is determined based upon brightness detected by the illumination sensor. If the first terminal body is in a closed state with respect to the second terminal body, a previously detected brightness is compared to the first value. If the previously detected brightness is greater than the first value, the charging circuit is activated, and if the previously detected brightness is smaller than the first value, the currently generated current of the solar cell is compared to a second value. If the currently generated current of the solar cell is smaller than the second value, the amount of the generated current is rechecked a preset number of times, and thereafter if the rechecked generated current is smaller than the second value, the operation of the charging circuit is suspended.

In accordance with one embodiment, a mobile terminal comprises a terminal main body; an illumination sensor mounted at a first surface of the terminal main body, the first surface provided with a display; a solar cell mounted at a second surface of the terminal main body; and a controller configured to control whether to operate a charging circuit for charging a battery based upon brightness detected by the illumination sensor and a generated current of the solar cell. The controller is configured to operate the charging circuit for charging the battery if the brightness detected by the illumination sensor is more than a reference brightness.

The controller is configured to restrict the operation of the charging circuit if the generated current of the solar cell is less than reference current, when the brightness detected by the illumination sensor is more than reference brightness. The controller is configured to compare the previously detected value of the illumination sensor with a reference brightness if the brightness detected by the illumination sensor is less than the reference brightness, wherein if the previously detected value of the illumination sensor is greater than the reference brightness, the controller supplies power to the charging circuit, and if the previously detected value of the illumination sensor is smaller than the reference brightness, the controller controls the illumination sensor to redetect brightness.

The controller is configured to generate an audio or visual signal, if the previously detected value of the illumination sensor is greater than reference brightness. The controller is configured generate an audio or visual signal if the generated current of the solar cell is less than a reference current even when the brightness detected by the illumination sensor is more than a reference brightness. The controller is configured to recheck the amount of the generated current a preset number of times if the currently generated current of the solar cell is smaller than a reference current, and thereafter if the rechecked generated current is smaller than the reference current, the controller is configured to restrict the operation of the charging circuit.

A computer readable storage medium comprising executable logic code, wherein when the logic code is executed on a computer causes the computer to detect brightness of ambient light around the mobile terminal by an illumination sensor of the mobile terminal; activate a charging circuit for charging a battery of the mobile terminal when the detected brightness is more than a first value; measure a generated current of a solar cell; and deactivate the charging circuit when the generated current of the solar cell is below a second value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

DETAILED DESCRIPTION OF EXEMPLARY EMBODIMENTS

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" is used interchangeably.

Figure 1:
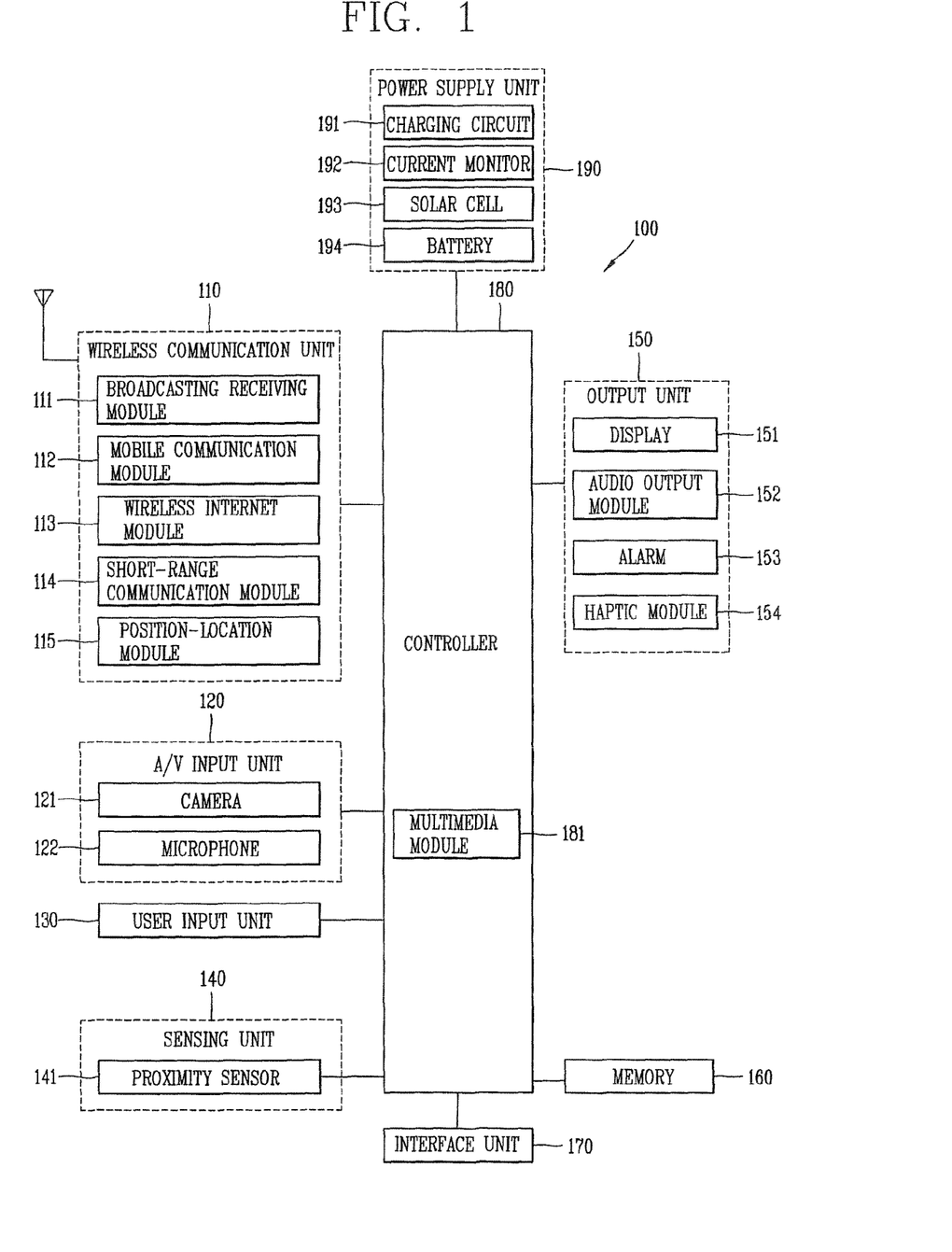
FIG. 1 is a block diagram of a mobile terminal in accordance with an exemplary embodiment.

Referring to FIG. 1, a mobile terminal 100 in accordance with one embodiment may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that inclusion all of the illustrated components is not a requirement. Greater or fewer components may be included, depending on implementation.

The wireless communication unit 110 may include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast associated information may indicate information relating to broadcast channels, broadcast programs or broadcast service providers.

The broadcast signal may be implemented as a TV broadcast signal, a radio broadcast signal, and a data broadcast signal, among others. The broadcast signal may further include a data broadcast signal combined with a TV or radio broadcast signal. Further, the broadcast associated information may be provided via a mobile communication network and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages. The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (MID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module. According to the current technology, the GPS module 115 can measure accurate time and distance respectively from more than three satellites and apply a triangulation scheme to the measured information so as to accurately calculate a three-dimensional current position of the mobile terminal on latitude, longitude and altitude.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display 151. The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like. In particular, the touch pad is layered with the display 151 to cooperate with each other, which may be referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like.

The sensing unit 140 may further include an illumination sensor (illuminance sensor, ambient light sensor) 141, which will be explained later, for control of the power supply 190. The illumination sensor 141 may serve as a primary information collecting device which senses or detects ambient brightness of the mobile terminal 100 so as to determine whether to operate a charging circuit 191 implementing the power supply 190. The illumination sensor 141 may detect the ambient brightness of the display 151 so as to provide the controller 180 with basic information for adjusting brightness of the display 151. The controller 180 may then increase the brightness of the display 151 when the result detected by the illumination sensor is higher than a reference value while decreasing the brightness of the display 151 if the result is lower than the reference value.

The brightness information detected by the illumination sensor 141 may be stored in the memory 160, which can be used as data required for comparison between current brightness and prior (past) brightness. The interface unit 170 is generally implemented to interface the mobile terminal 100 to external devices. For instance, the interface unit 170 may include, for example, wired/wireless headset ports, external charger ports, wired/wireless data ports, a memory card port, ports for connecting a device with an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Further, the interface unit 170 may receive data from an external device, or be provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals and power input from the cradle may operate as a signal for recognizing that the mobile terminal 100 has accurately been mounted to the cradle. The output unit 150 is configured to output an audio signal, a video signal or an alarm signal. The output unit 150 may include a display 151, an audio output module 152, an alarm 153 and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI. Also, the display 151 may visibly output an electricity-charged state generated from a solar cell 193 based upon information detected, respectively, by the illumination sensor 141 and a current monitor 192.

In the meantime, as mentioned above, if the display 151 is layered with a touch pad to cooperate with each other so as to configure a touch screen, the display 151 may be used as an input unit as well as an output unit. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The touch screen may be implemented to detect a touch pressure as well as a touch position and a touch area.

A proximity sensor 141 may be disposed in the touch screen or near the touch screen. The proximity sensor 141 denotes a sensor for detecting whether there is an object approaching a certain detection surface or existing near the certain detection surface by using a force of an electromagnetic field or infrared rays, without any mechanical contact. Even without the proximity sensor 141 mounted, if an electrostatic touch screen is provided, the proximity of a pointer can be detected based upon the change in an electric field due to the proximity of the pointer.

The audio output module 152 may output audio data which is received from the wireless communication unit 110 in various modes including call reception mode, call-placing (phone call) mode, recording mode, voice recognition mode, broadcast reception mode, and the like, or audio data stored in the memory 160. Also, the audio output module 152 may output an audio signal relating to a particular function (e.g., tone for call received, tone for message received, etc.) performed in the mobile terminal 100. The audio output module 152 may be implemented using a speaker, a buzzer, or the like.

The audio output module 152 may be configured to output an audible announcement (indication) message to users based upon the result detected by the illumination sensor 141 and the current monitor 192. The alarm 153 may output a signal to inform a generation of event associated with the mobile terminal 100. Typical events may include call received, message received, user input received and the like. In addition to generating the audio or video signal, the alarm 153 may also inform the event generation in different manners, for example, by providing tactile sensations (e.g., vibration) to make a user identify the event generation. If a call signal or message is received, the alarm 153 may vibrate to inform the reception. Alternatively, upon a key signal being input, the alarm 153 may output a vibration as a feedback for the key signal input. The signal for informing the event generation may also be output via the display 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may store or update information relating to illuminance (brightness) according to the present invention. The controller 180 may access the illuminance related information stored in the memory 160 so as to read or write such information.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component. The controller 180 may also determine whether to operate a charging circuit 191 based upon the result sensed by the illumination sensor 141 and the result detected by the current monitor 192, and provides users or counterparties with pre-stored or transmitted contents through video output/audio output or vibration.

The controller 180 can perform a pattern recognition processing so as to recognize writing or drawing input on the touch screen as text or image. The power supply 190 may be provided with a solar cell 193 and a battery 194 so as to be allowed for self-electricity generation and charging the generated electricity (power) to the battery 194. The power charged in the battery 194 may be supplied to each component of the mobile terminal 100 or upon operation of a circuit under the control of the controller 180. Since the amount of current generated by the solar cell 193 depends on ambient brightness of the mobile terminal 100, in the present invention, when a current larger than a preset value is generated, the controller 180 activates (operates, activates) the charging circuit 191 so as to charge electricity generated by the solar cell 193 to the battery 194.

The power supply 190 may further be provided with the charging circuit 191 for charging the battery 194. An integrated circuit (IC) implementing the charging circuit 191 needs minimum power consumed by itself for operation. The power supply 190 may further be provided with a current monitor 192 for controlling the charging circuit 191 in cooperation with the illumination sensor 141. The current monitor 192 may continuously store and analyze the amount of electricity generated while the solar cell 193 is operated. The controller 180 may primarily determine whether to operate the charging circuit 191 based upon the detected result from the illumination sensor 141 as mentioned above, and regulate the operation of the charging circuit 191 to be appropriate for various conditions on the basis of the detected result of the current monitor 192 for the electricity generation of the solar cell 193, which will be described later in detail.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180. As such, the mobile terminal has been described from the perspective of components for each function. Hereinafter, description will be given in more detail of the mobile terminal according to the present invention from the perspective of components depending on an outer appearance of the mobile terminal.

Figure 2:
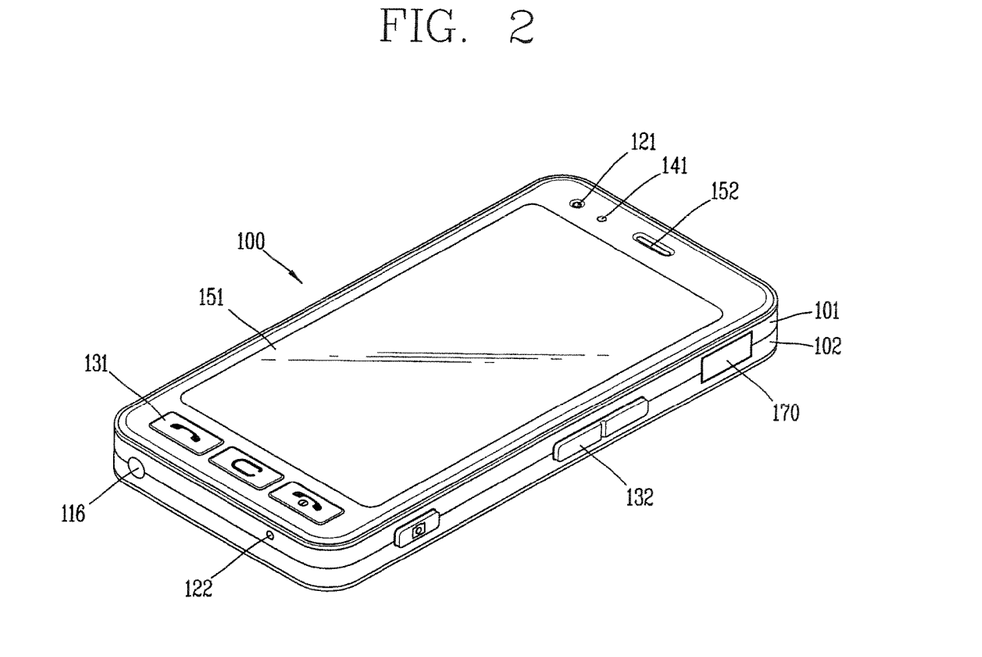
FIG. 2 is a front perspective view of a mobile terminal in accordance with one embodiment.

FIG. 2 is a front perspective view of the mobile terminal according to one embodiment. The mobile terminal 100 disclosed is provided with a bar type terminal body. A case (casing, housing, cover, etc.) forming an outer appearance of a terminal body. In this embodiment, the case may include a front case 101 and a rear case 102. A space formed by the front case 101 and the rear case 102 may accommodate various components therein. At least one intermediate case may further be disposed between the front case 101 and the rear case 102. Such cases may be formed by injection-molded synthetic resin, or may be formed using a metallic material such as stainless steel (STS) or titanium (Ti).

The terminal body is shown, on a front surface, having a display unit 151, an audio output module 152, a first image input unit 121, an illumination sensor 141 and the like. The display 151 denotes a device for visually displaying information. Example of the display 151 may include a liquid crystal display (LCD), an organic light emitting diode (OLED), an e-paper and the like. The display 151 may further include a touch sensitive portion so as to allow information to be input by a user's touch. Hence, if a touch input is detected on a position on the display 151, a content(s) corresponding to the touched position is input.

The contents input in the touch-sensitive manner may include characters (letters) or numerals, indications in various modes or definable menu items. The touch sensitive portion may be transparent so that the display 151 is visible and have a structure for enhancing visibility of a touch screen at a bright place. In FIG. 2, the display 151 occupies most of a front surface of the front case 102. The first audio output module 152 may serve as a receiver to output call related sounds to users. Alternatively, the first audio output module 152 may act as a loud speaker for outputting various alarm sounds of systems or multimedia reproduction sounds.

The illumination sensor 141 may detect ambient brightness around the mobile terminal for visibility of the display 151. Also, the illumination sensor 141 may detect brightness for determining whether to operate the charging circuit 191 in order to activate the solar cell 193, as provided in further detail below. The terminal body is shown, on a side surface, having side keys 132, an interface unit 170 and an audio input unit 122. The side keys 132 may be referred to as a manipulation unit, and receive commands for controlling operations of the mobile terminal 100. The side keys 132 may be operated by a user in any tactile manner. Contents input via the side keys 132 may variously be set. For instance, the side keys 132 may be configured to receive commands, such as control of the image input unit 121, adjusting audio sound output via the audio output modules 152 and 152', conversion of the display 151 into a touch recognition mode or the like.

The audio input unit 122 may be implemented, for example, as a type of a microphone, for receiving user's voice, other sounds and the like. The interface unit 170 may serve to interface the mobile terminal 100 according to the present invention with external devices for data exchange therebetween. For example, examples of the interface unit 170 may include at least one of a connection terminal to be connected to an earphone by wire or wirelessly or a power supply terminals for supplying power to ports for short-range communications (e.g., an Infrared Data Association (IrDA) port, a BLUETOOTH port, a wireless LAN port and so on). Alternatively, the interface unit 170 may be configured as a card socket for accommodating a Subscriber Identification Module (SIM) card, a User Identity Module (UIM) card, or an external card such as a memory card for storing information.

Figure 3:
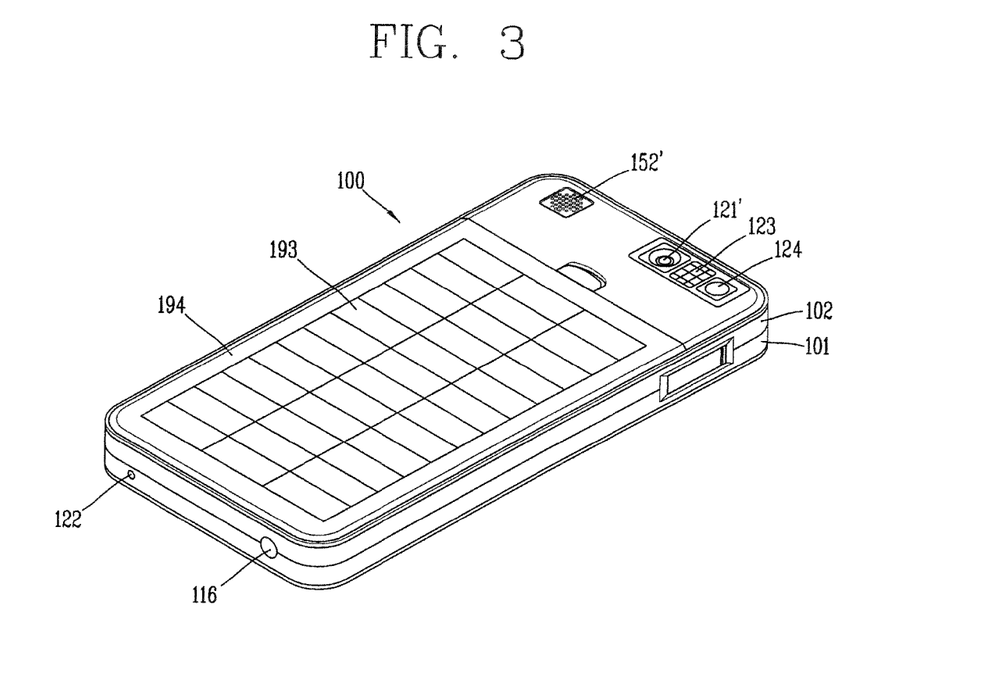
FIG. 3 is rear perspective view of the mobile terminal in accordance with the one embodiment.

FIG. 3 is a rear perspective view of the mobile terminal of FIG. 2. As shown in FIG. 3, a rear surface of the terminal body may further be provided with a second image input unit 121'. The second image input unit 121' faces a direction which is opposite to a direction faced by the first image input unit 121 located on the front surface of the terminal body, and may be a camera having different pixels from those of the first image input unit 121.

For example, the first image input unit 121 may operate with relatively lower pixels (lower resolution). Thus, the first image input unit 121 may be useful when a user can capture his face and send it to another party during a video call or the like. On the other hand, the second image input unit 121' may operate with a relatively higher pixels (higher resolution) such that it can be useful for a user to obtain higher quality pictures for later use. Such first and second image input units 121 and 121' may be installed in the terminal body to be rotatable or popped up.

A flash 123 and a mirror 124 may additionally be disposed adjacent to the second image input unit 121'. The flash 123 operates in conjunction with the second image input unit 121' when taking a picture using the second image input unit 121'. The mirror 124 can cooperate with the second image input unit 121' to allow a user to photograph himself in a self-portrait mode.

A second audio output module 152' may further be disposed at a rear surface of the terminal body. The second audio output module 152' can cooperate with the first audio output module 152 to provide stereo output. Also, the second audio output module 152' may be configured to operate as a speakerphone. A battery 194 for supplying power to the mobile terminal 100 may be mounted to the rear surface of the terminal body. The battery 194 may be internally disposed at the terminal body, or be detachably disposed outside the terminal body.

The solar cell 193 for generating electricity by using sunlight or illumination lamp may be mounted onto a rear surface of the terminal body or a rear surface of the battery 194. The solar cell 193 may be configured by connecting a plurality of unit cells in series or in parallel, and also have a specific pattern.

As such, the illumination sensor 141 according to the present invention may be installed at the front surface of the terminal body at which the display 151 is disposed, while the solar cell 193 may be installed at the rear surface of the terminal body. That is, the illumination sensor 141, as will be explained later, may be used to adjust brightness of the display 151, accordingly it is located at the position where the display 151 is disposed. In addition, the detected result of the illumination sensor 141 may be used to determine whether to operate (activate, activate) the charging circuit 191 upon the solar 193 generating electricity, whereby the employment of the illumination sensor 141 can result in the reduction of the number of components and enabling various functions. The battery 194 may also be configured to store electricity generated by the solar cell 193 or store power supplied from a home power source.

Figure 4:
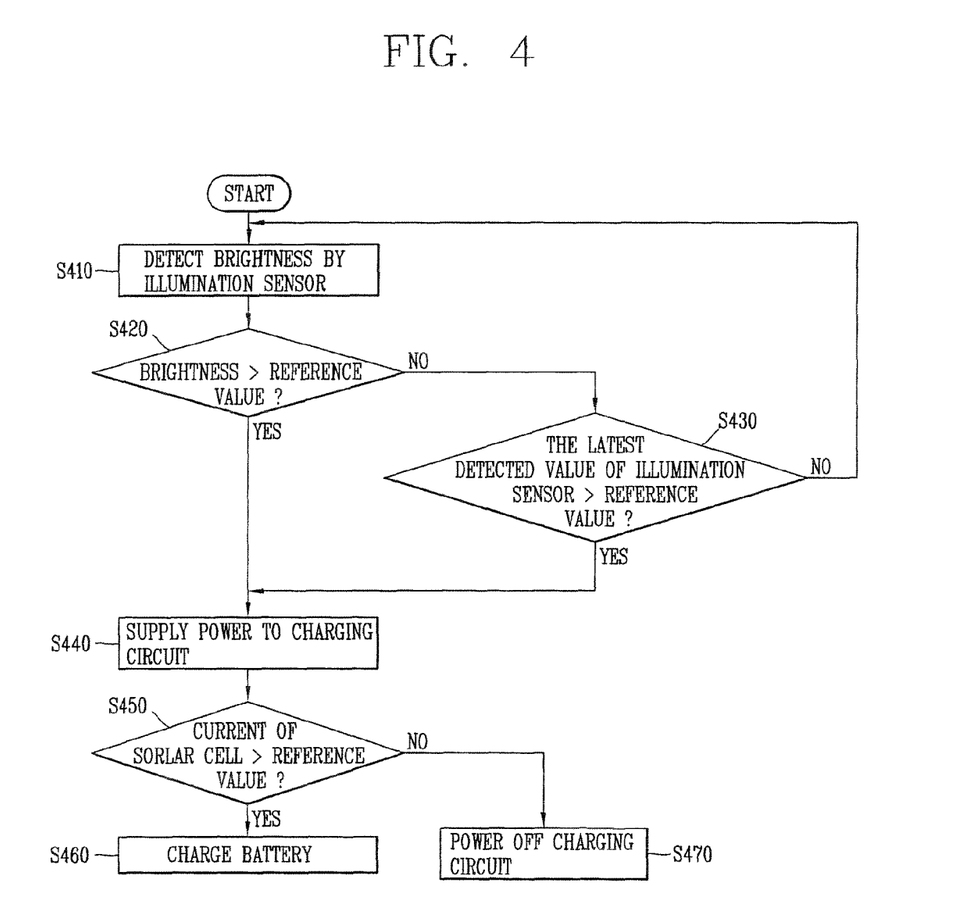
FIG. 4 is a flowchart showing one exemplary charging method using a mobile terminal in accordance with one embodiment.

Referring to FIG. 4, the charging method using the mobile terminal depends on the illumination results measured by the illumination sensor 141. The illumination sensor 141 is allowed to detect ambient brightness (i.e., quantity of light) around the mobile terminal (S410). It is checked whether the brightness detected by the illumination sensor 141 is more than a reference value (S420). The reference value may be greater than or equal to brightness corresponding to minimum power needed to operate the charging circuit 191 for charging the battery 194. If the brightness detected by the illumination sensor 141 is more than the reference value, the charging circuit 191 for charging the battery 194 is activated (S440). On the other hand, if the brightness value detected by the illumination sensor 141 is smaller than the reference value, the latest (previously) detected value of the illumination sensor 141 is retrieved (selected) from the memory and the latest detected value is compared to the reference value (S430).

The process in S430 is performed to determine whether brightness has drastically changed within a short time or whether the same brightness is intentionally retained for a long time. For instance, in some cases where the solar cell 193 temporarily faces away from the sun or a light source, or when the solar cell 193 is temporarily obscured from the sun by the palm or other objects, or the like, the charging circuit 191 is kept activated. This case corresponds to the latest detected value being greater than the reference value. In contrast, if the latest detected value of the illumination sensor 141 is also smaller than the reference value, the charging circuit 191 is not activated but the detected result of the illumination sensor is kept monitored.

Even when the result detected by the illumination sensor 141 is more than the reference value, if the quantity of electricity generated by the solar cell 193 is insignificant, the current monitor 192 is allowed to check whether a charged (generated) current of the solar cell 193 is larger than a reference value, so as to block (restrict) an unnecessary operation of the charging circuit 191. Here, the reference value compared to the generated current may be set to be larger than or equal to a current corresponding to the minimum power needed for effectively charging the battery.

If the current generated by the solar cell 193 is smaller than the reference value (S450), the operation of the charging circuit 191 is restricted (S470), and if the current generated by the solar cell 193 is larger than the reference value, the charging circuit 191 is kept operated so as to charge the battery 194 (S460). Accordingly, when the electricity (power) generated by the solar cell 193 is greater than the consumed power of the charging circuit 191, the charging circuit 191 is activated, thereby preventing discharging of the battery 194 in spite of the solar cell 193 generating electricity.

Figure 5:
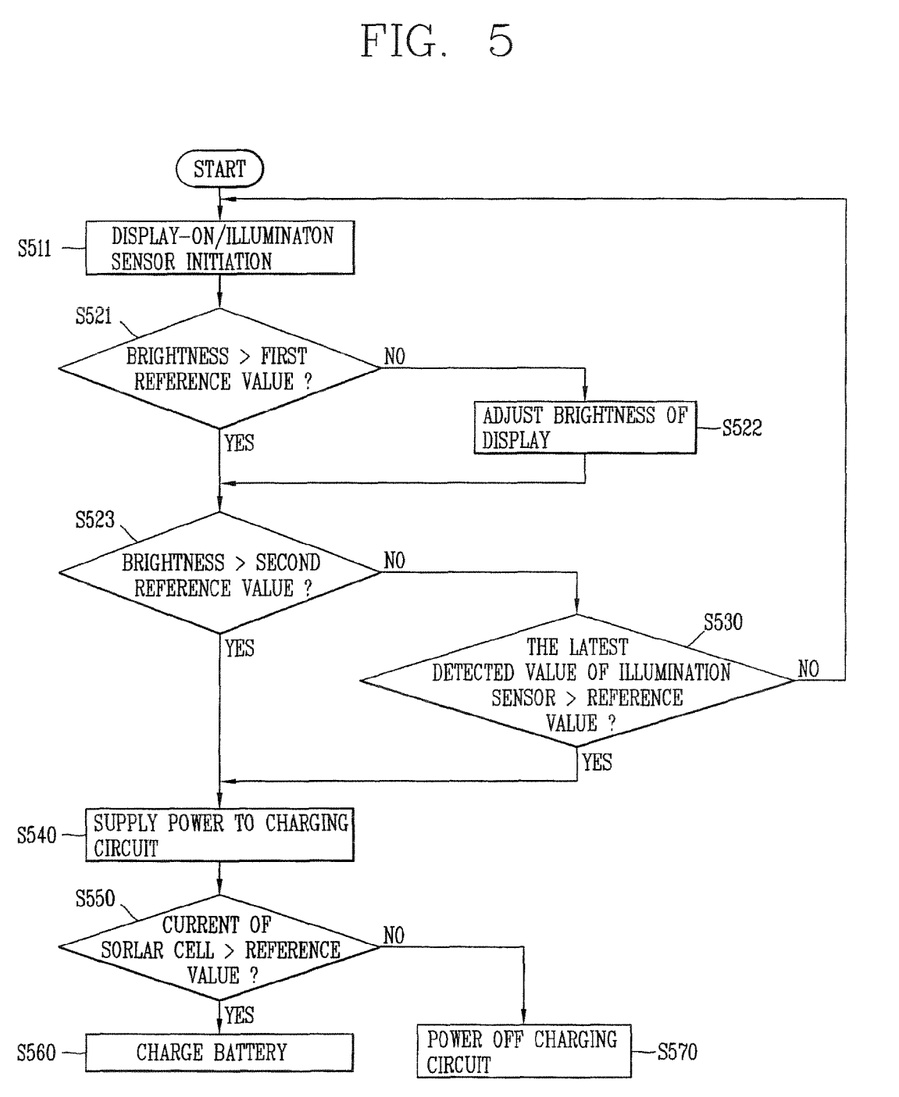
FIGS. 5 to 7 are flowcharts each showing a charging method of a mobile terminal in accordance with one or more embodiments.

FIG. 5 is a flowchart showing a charging method of a mobile terminal in accordance with another embodiment. According to one embodiment, a process is performed to compare the detected result of the illumination sensor 141 with two reference values, respectively. In a state where the display 151 is on and the illumination sensor 141 is initiated (S511), comparison is performed to check whether brightness detected by the illumination sensor 141 is greater than a first reference value (S521). The first reference value denotes a reference value for adjusting brightness of the display 151. If the detected brightness is less than the first reference value, the brightness of the display 151 is adjusted (S522).

Otherwise, another comparison is performed to check whether the brightness detected by the illumination sensor 141 is greater than a second reference value (S523), if so, power is supplied to the charging circuit 191 (S540). If the detected brightness value is smaller than the second reference value, the latest detected value of the illumination sensor 141 is compared to the second reference value. If the latest detected value by the illumination sensor is greater than the second reference value, then power is supplied to charging circuit 191 (S530, S540). If the current of the solar cell is greater than a predetermined value, then the battery is charged, else the charging circuit is deactivated (S550, S560, S570). In this example, the second reference value denotes a value greater than or equal to power needed to effectively charge the battery. Thus, the second reference value is independent of the first reference value. Accordingly, the illumination sensor 141 is used to execute two functions, namely, adjusting the brightness of the display 151 and determining whether to activate the charging circuit 191.

Figure 6:
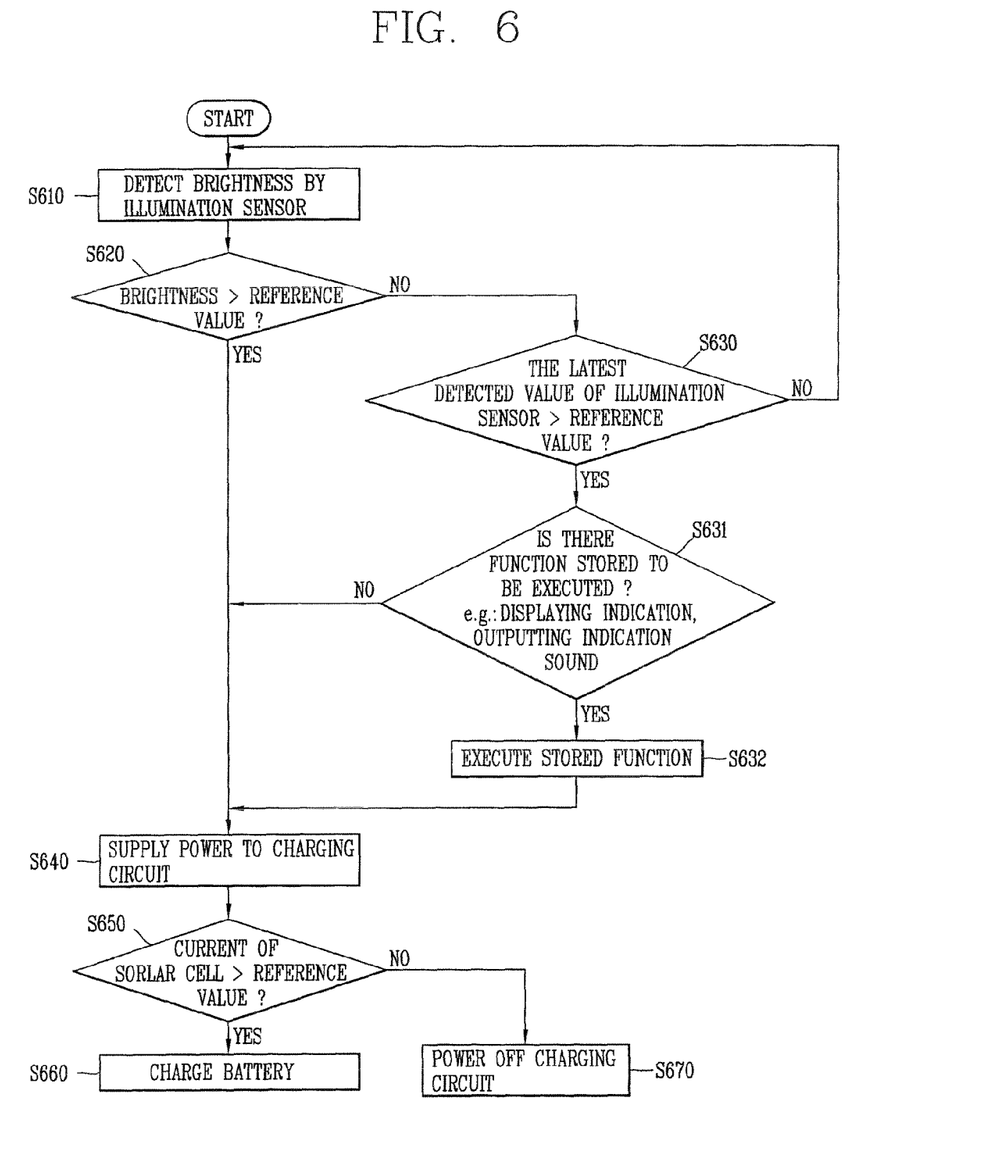

FIG. 6 is a flowchart showing a charging method of a mobile terminal in accordance with another embodiment. In this embodiment, after comparing the latest detected value of the illumination sensor 141 to a reference value, if the latest detected value of the illumination sensor 141 is greater than the reference value, this state is regarded as a temporary block from sunlight, whereby a function stored for electricity generation of the solar cell 193 is executed or a user interface is provided.

That is, it is determined whether the brightness value detected by the illumination sensor 141 is greater than the reference value (S620). If the detected value is greater than the reference value, the latest detected value of the illumination sensor 141 is then compared to the reference value (S630). If the latest detected value of the illumination sensor 141 is greater than the reference value, whether there is a function stored to be executed in this state is determined (S631). For instance, the function stored to be executed in this state may correspond to visually displaying of an indication or audibly outputting of an indication sound so as to render a user lay the mobile terminal such that the solar cell 193 faces a correct direction.

In this example, if the illumination sensor 141 and the solar cell 193 normally operate, the user may be informed of whether to activate the charging circuit 191 and alerted to reposition the mobile terminal toward the ambient light (if the light is being blocked), thereby rendering the charging of the battery possible.

Figure 7:
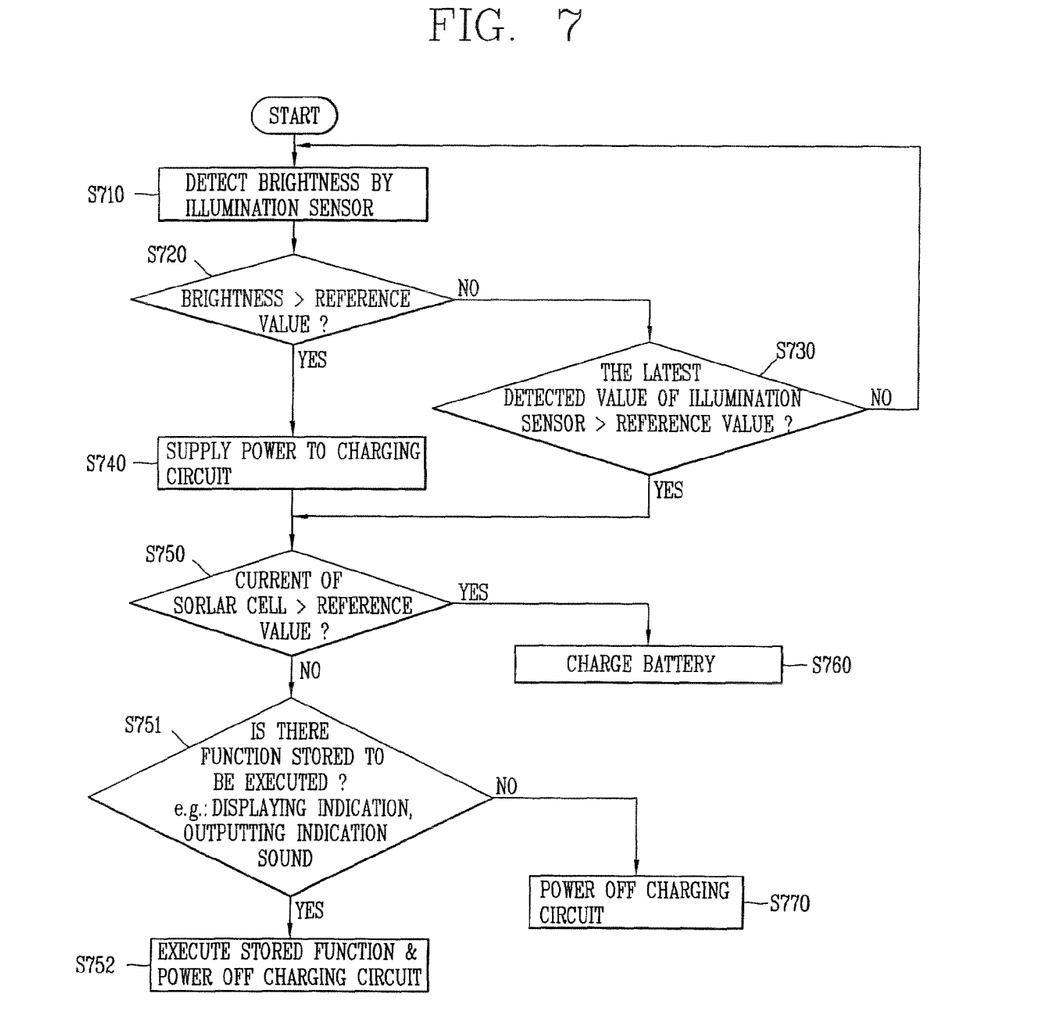

FIG. 7 is a flowchart showing a charging method of a mobile terminal in accordance with another embodiment. In this embodiment, the brightness of the ambient light is detected by the illumination sensor (S710) and when the ambient brightness value of the mobile terminal is greater than a reference value (S720), if a current of the solar cell 193 measured by the current monitor 192 is smaller than a reference value, it is considered as the solar cell 193 being temporarily blocked from sunlight, and accordingly a function stored for electricity generation of the solar cell 193 is executed or a user interface is provided to alert the user that the ambient light is being blocked. If the latest detected value of illumination is greater than a reference value (S730), then the system moves to S750 as provided in further detail below.

In a state where power is supplied to the charging circuit 191 (S740), it is determined whether a current of the solar cell 193 is larger than a reference value (S750). If the current is smaller than the reference value, it is determined whether there is a function stored to be executed (S751), otherwise the battery is charged (S760). If a function is to be executed, the stored function is executed and the charging circuit is powered off (S752), otherwise the charging circuit is powered off (S770). The function stored to be executed may, for example, correspond to visually displaying an indication or audibly outputting an indication sound to notify a user to position the mobile terminal such that the solar cell 193 faces a correct direction. Hence, the different consequences resulted from different installation positions of the illumination sensors 141 and the solar cell 193 can be correctly rectified.

Figure 8:
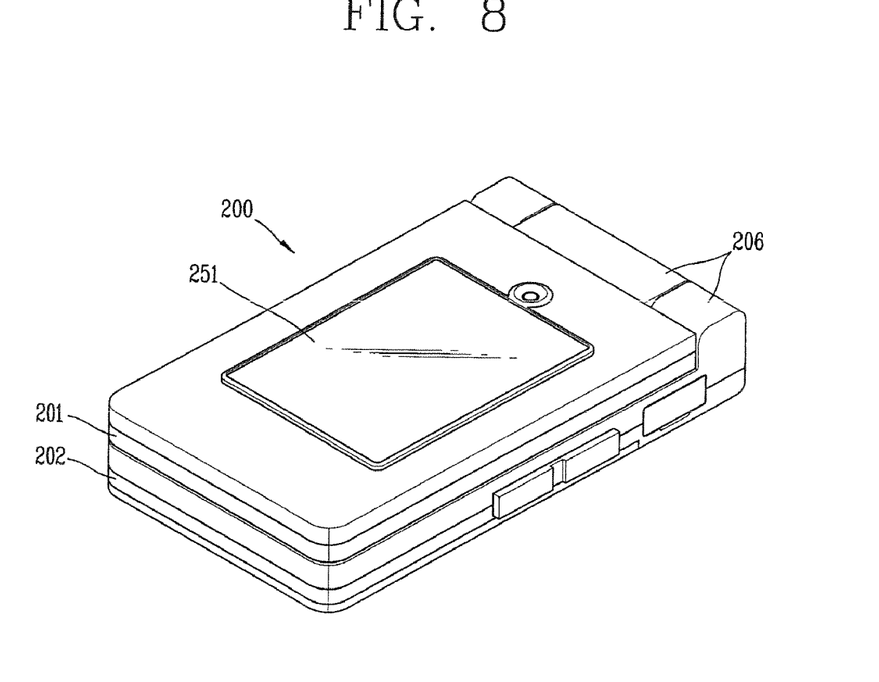
FIG. 8 is a perspective view showing a mobile terminal in accordance with another embodiment.
Figure 9:
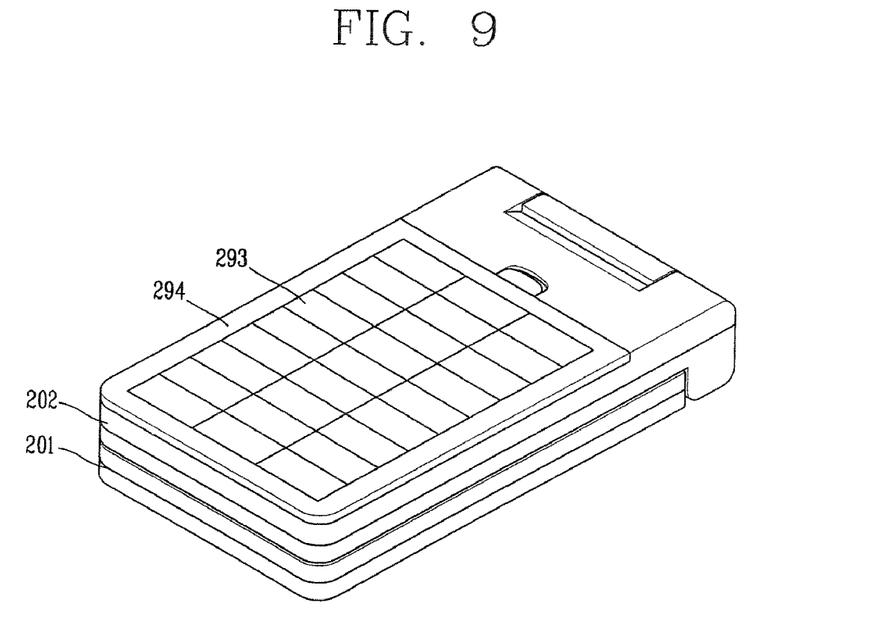
FIG. 9 is a rear perspective view of the mobile terminal of FIG. 8 in one embodiment.
Figure 10:
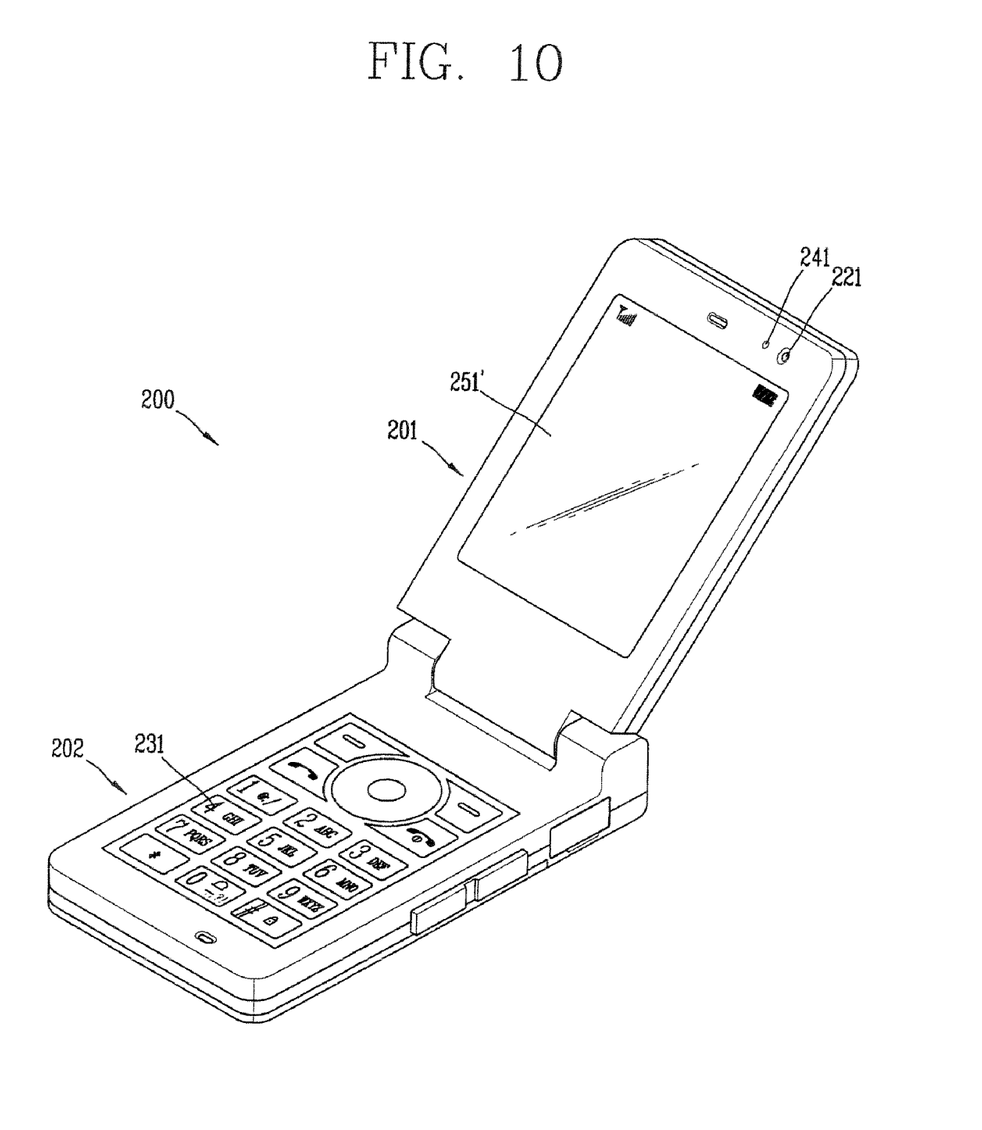
FIG. 10 is a front perspective view of the mobile terminal of FIG. 8 in one embodiment.

FIG. 8 shows another embodiment of a mobile terminal. FIG. 8 shows a front surface of the mobile terminal in a closed state. FIG. 9 shows a rear surface of the mobile terminal in a closed state, and FIG. 10 shows a front surface of the mobile terminal in an open state. As shown in FIGS. 8 to 10, a mobile terminal 200 may comprise a main body part 202 and a folder part 201 foldably coupled to the main body part 202 by hinge portions 206. An outer surface of the folder part 201 is shown having a first display 251. A second display 251' may be installed at a folded inner surface of the folder part 201. As shown in FIG. 10, an illumination sensor 241 may be provided at one side of the second display 251 for allowing adjustment of brightness of the second display 251' depending on an ambient brightness.

A battery 294 for supplying power may be detachably mounted onto a rear surface of the main body part 202. A solar cell 293 may be mounted on the rear surface of the main body part 202 or a surface of the battery 294. As such, according to this embodiment, the ambient brightness of the illumination sensor 241 remarkably differs, respectively, in an unfolded state and a folded state of the folder part 201 having the illumination sensor 241. Hence, whether to activate a charging circuit may be determined in consideration of the configuration.

Figure 11:
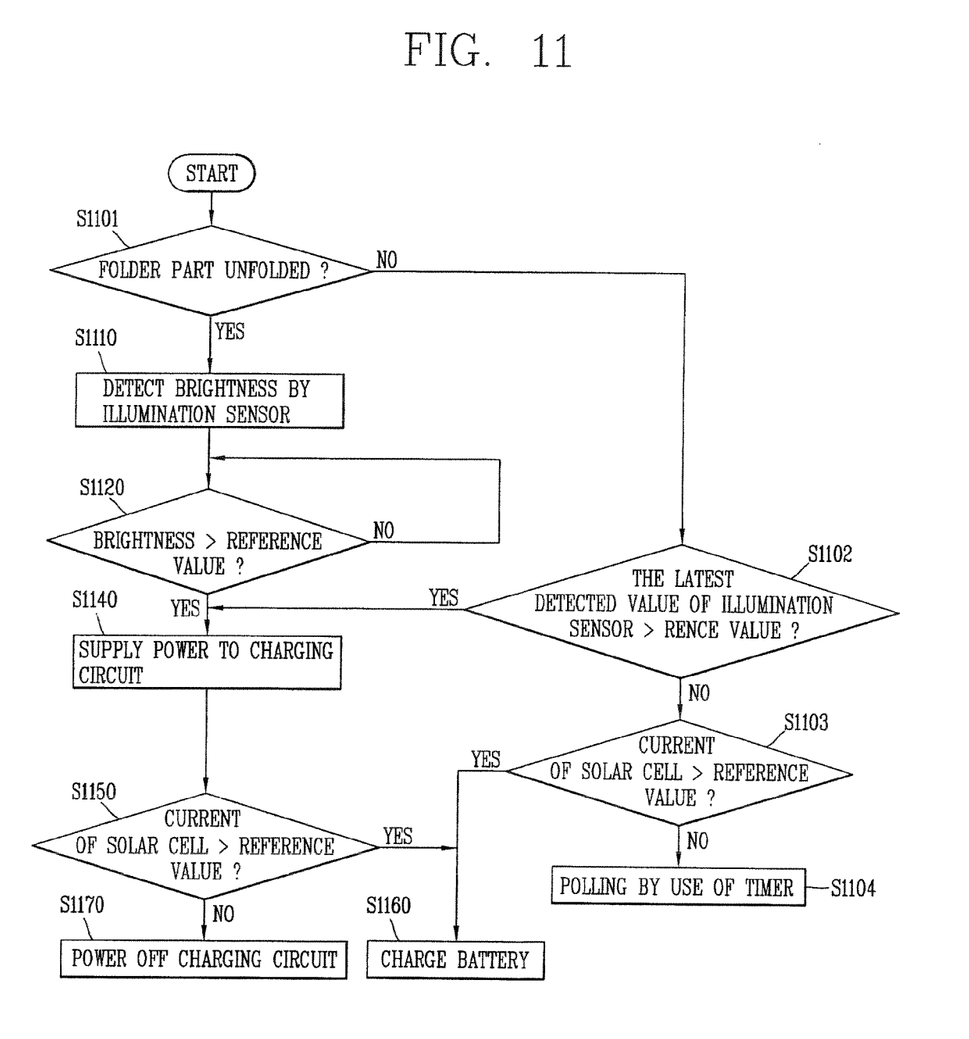
FIG. 11 is a flowchart showing an exemplary charging method of the mobile terminal shown in FIGS. 8 to 10.

FIG. 11 is a flowchart showing a charging method of the mobile terminal illustrated in FIGS. 8 to 10. According to this embodiment, it is determined whether the folder part 201 is in an unfolded state (S1101). In the unfolded state of the folder part 201, whether to activate the charging circuit may be determined according to the method illustrated in FIG. 4 (e.g., processes S1110 to S1170 correspond to the steps S410 to S470, respectively). For the purpose of brevity, a duplicative discussion of the above processes is not repeated here.

However, in the folded state, the second display 251' and the illumination sensor 241 are in a disable (unavailable) state, so a charging method is decided by using a previously (latest) detected value of the illumination sensor 241 and a currently charged (generated) current of the solar cell 293. That is, in the folded state of the folder part 201, the previously detected value of the illumination sensor 241 is compared to a reference value (S1102). If the previously detected value is greater than the reference value (S1103) (e.g., in a case where the folder part 201 was unfolded previously and the ambient brightness was greater than a reference value), the solar cell 193 may be operated in spite of the folded state of the folder part 201, resulting in activating the charging circuit and charging the battery (S1160).

After comparing the previous detected value of the illumination sensor 241 with the reference value, even when the previously detected value is smaller than the reference value, if the quantity of electricity generated by the solar cell 293 is sufficient, a current of the solar cell 293 is compared with a reference value in order to operate the charging circuit 291. If the current of the solar cell is larger than the reference value, the charging circuit 291 is activated and the battery 294 is charged. On the other hand, if the current of the solar cell is smaller than the reference value, the current of the solar cell 293 is periodically compared with the reference value a number of times (i.e., polling by use of a timer) (S1104).

A controller may control the operation of the charging circuit in cooperation with the illumination sensor depending on whether the phone is in an open or folded stated. In addition, in the folded or closed state of the folder part (i.e., in a non-operating state of the illumination sensor), the controller may control the charging circuit to be operated depending on the ambient brightness of the mobile terminal. Therefore, unnecessary discharging of electric energy can be prevented.

As provided above, by employing the charging method of the mobile terminal, the illumination sensor is utilized to determine whether to operate the charging circuit of the battery according to an ambient brightness, thereby preventing discharging of the battery due to power consumed by the charging circuit exceeding the charged power in the battery under a weak brightness environment. The illumination sensor can cooperate with the current monitor of the solar cell to allow a smooth charging by use of the solar cell under more various conditions.

The foregoing embodiments and advantages of the charging method of the mobile terminal having described are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A charging method of a mobile terminal, the method comprising:
   detecting brightness of ambient light around the mobile terminal by an illumination sensor of the mobile terminal;
   activating a charging circuit for charging a battery of the mobile terminal when the detected brightness is greater than a first value;
   measuring a current generated by a solar cell;
   deactivating the charging circuit when the measured generated current is less than a second value; and
   comparing a brightness previously detected by the illumination sensor to the first value when the detected brightness of the ambient light is less than the first value.

2. The method of claim 1, wherein:
   the illumination sensor is positioned at a first surface of a body of the mobile terminal;
   the first surface has a display; and
   the solar cell is positioned at a second surface of the body of the terminal.

3. The method of claim 1, further comprising supplying power to the charging circuit if the previously detected brightness is greater than the first value.

4. The method of claim 1, further comprising generating an audio or visual signal to alert a user if the previously detected brightness is greater than the first value.

5. The method of claim 1, further comprising generating an audio or visual signal to alert a user if the generated current is less than the second value and the detected brightness is greater than the first value.

6. The method of claim 1, further comprising deactivating the charging circuit if the generated current is less than the second value and the detected brightness is greater than the first value.

7. The method of claim 1, further comprising:
   activating the charging circuit if the previously detected brightness is greater than the first value; and
   comparing the generated current to the second value if the previously detected brightness is less than the first value.

8. The method of claim 7, further comprising:
   re-measuring the current generated by the solar cell a preset number of times if the generated current is less than the second value; and
   suspending operation of the charging circuit if the re-measured current is less than the second value.

9. A mobile terminal comprising:
   a terminal main body;
   an illumination sensor mounted at a first surface of the terminal main body and configured to detect brightness, the first surface provided with a display;
   a solar cell mounted at a second surface of the terminal main body; and
   a controller configured to:

control operation of a charging circuit for charging a battery based upon the detected brightness and a measurement of a current generated by the solar cell; and generate an audio or visual signal if the measured current is less than a reference current even when the detected brightness is greater than a reference brightness.

10. The terminal of claim 9, wherein the controller is further configured to operate the charging circuit if the detected brightness is greater than the reference brightness.

11. The terminal of claim 9, wherein the controller is further configured to restrict operation of the charging circuit if the generated current is less than the reference current and the detected brightness is greater than the reference brightness.

12. The terminal of claim 9, wherein the controller is further configured to:

compare a brightness previously detected by the illumination sensor to the reference brightness if the detected brightness is less than the reference brightness;

supply power to the charging circuit if the previously detected brightness is greater than the reference brightness; and control the illumination sensor to re-detect brightness if the previously detected brightness is less than the reference brightness.

13. The terminal of claim 9, wherein the controller is further configured to generate an audio or visual signal if the previously detected brightness is greater than the reference brightness.

14. The terminal of claim 9, wherein the controller is further configured to:

re-measure the generated current a preset number of times if the generated current is less than the reference current; and restrict operation of the charging circuit if the re-measured generated current is less than the reference current.

15. A charging method of a mobile terminal comprising a first terminal body and a second terminal body coupled in a folding configuration, the method comprising:

detecting, by an illumination sensor, brightness of ambient light around the mobile terminal;

activating a charging circuit for charging a battery of the mobile terminal when the detected brightness is greater than a first value;

measuring a current generated by a solar cell;

deactivating the charging circuit when the generated current is less than a second value;

determining whether to operate the charging circuit based upon the detected brightness if the first terminal body is in an open state with respect to the second terminal body; and comparing a previously detected brightness to the first value if the first terminal body is in a closed state with respect to the second terminal body, wherein the illumination sensor and a display are positioned on an inner face of the first terminal body in the closed state, and wherein the solar cell is positioned on an external surface of the second terminal body.

* * * * *